United States Patent [19]
Tharp et al.

[11] Patent Number: 4,781,404
[45] Date of Patent: Nov. 1, 1988

[54] MULTI-PATH FLUID SWIVEL

[75] Inventors: Samuel P. Tharp, Houston; Edward H. Turner, Sugarland; Joe W. Key, Magnolia, all of Tex.

[73] Assignee: Key Ocean Services, Inc., Magnolia, Tex.

[21] Appl. No.: 117,362

[22] Filed: Oct. 28, 1987

Related U.S. Application Data

[63] Continuation of Ser. No. 859,173, May 2, 1986, abandoned.

[51] Int. Cl.⁴ ............................................. F16L 39/04
[52] U.S. Cl. ..................................... 285/94; 285/111; 285/136; 285/370
[58] Field of Search ............... 285/276, 275, 111, 910, 285/136, 370, 94

[56] References Cited

U.S. PATENT DOCUMENTS

| | | | |
|---|---|---|---|
| 2,343,491 | 3/1944 | Bard et al. | 285/136 |
| 2,781,134 | 2/1957 | Weir et al. | 285/136 X |
| 2,789,847 | 4/1957 | Jackson | 285/276 X |
| 2,815,973 | 12/1957 | Jackson | 285/276 X |
| 2,906,548 | 9/1959 | Faccou | 285/111 X |
| 3,290,068 | 12/1966 | Jackson | 285/276 |
| 3,372,949 | 3/1968 | McLay | 285/370 X |
| 3,468,564 | 9/1969 | Frohlich | 285/111 |
| 3,648,311 | 3/1972 | Voss | 285/134 X |
| 3,694,008 | 9/1972 | Slator et al. | 285/94 |
| 4,111,467 | 9/1978 | de Fremery | 285/136 |
| 4,126,336 | 11/1978 | Ortloff et al. | |
| 4,602,806 | 7/1986 | Saliger | 285/136 X |
| 4,618,154 | 10/1986 | Freudenthal | 285/111 X |
| 4,647,076 | 3/1987 | Pollack et al. | 285/111 X |

FOREIGN PATENT DOCUMENTS

| | | | |
|---|---|---|---|
| 628321 | 10/1961 | Canada | 285/111 |
| 2559302 | 7/1976 | Fed. Rep. of Germany | 285/136 |
| 2348428 | 4/1977 | France . | |
| 48050 | 12/1972 | Japan | 285/136 |

Primary Examiner—Thomas F. Callaghan
Attorney, Agent, or Firm—Steve Rosenblatt

[57] ABSTRACT

A multi-line or multi-path fluid swivel contains a plurality of stacked modules with each module having an internal core and an external housing. Each core includes one integral flow conduit which extends from the bottom of the core and opens through the side of the core into an annular chamber between the core and the housing. An opening in the housing permits flow of fluid out of or into the annular chamber. Seals between adjacent cores and seals between the cores and housing prevent or reduce leakage. The housings are rotatably mounted on the corresponding core with spaces between adjacent housings to permit axial core growth and deflection. Means between housings transmit rotational forces between housings and yet permit relative movement in the axial direction. Means are provided to fasten the adjacent cores to each other which act both as a dowel for transmitting rotational forces and as a bolt for locking cores together in the axial direction.

16 Claims, 5 Drawing Sheets

MULTI-PATH FLUID SWIVEL

This application is a continuation, of application Ser. No. 859,173, filed May 2, 1986.

BACKGROUND OF THE INVENTION

This invention relates to a swivel useful in transferring fluids and in particular to a multiple line swivel capable of transferring fluids between a plurality of fixed lines and a plurality of rotating lines. The invention is particularly useful in transferring fluids between ships and the ocean floor.

The offshore production of oil at substantial distances from land or in remote areas often makes it impractical to install a pipeline on the sea floor so that the oil produced from the offshore wells can be pumped directly to shore for storage and/or further transportation or processing. Oil produced under such circumstances is more conveniently delivered directly or by short feeder pipelines to a moored dedicated vessel, such as an oil tanker where it can be processed or stored until transshipment. Mooring a vessel offshore for extended periods presents many problems, including anticipated storm conditions at the mooring location. It is desirable for mooring systems to permit the vessel to weathervane or rotate so that the vessel will always face into prevailing seas, current and wind. A suitable mooring system for an offshore vessel which permits it to weathervane employs a pivoting assembly built into or attached to the vessel to allow for collection of oil or gas while the vessel is moved about or weathervanes.

Normally, a group of fluid lines extend from the ocean floor to the vessel. These fluid lines permit the transfer of a variety of fluids between the vessel and the ocean floor. For example, certain fluid lines may be used to convey the oil and/or gas into the vessel while other fluid lines may be used to inject liquids or gases back into the reservoir while still others may be used for hydraulic or other control functions. Although these fluid lines are somewhat flexible and thus permit some movement of the vessel, they are fixed to the ocean floor and will not rotate to any significant degree. Therefore, in order to convey the fluids between these flexible but fixed fluid lines and the rotating vessel, it is necessary to have a fluid swivel. Since some of these fluid lines may be rather large, since some of the fluids may be at high pressures and also at different pressures and temperatures from the fluids in other lines, a number of complications are introduced into providing a fluid swivel which will be both leakproof and functional. To date, the highest design pressure for a swivel is about 2,600 psi with an actual operating pressure of less than 1,000 psi.

SUMMARY OF THE INVENTION

The swivel of the present invention is a multiline fluid swivel capable of transferring very high pressure fluids (such as 3,000 psi) and various fluids such as oil, gas or water with varying pressures and temperatures. The swivel generally comprises a plurality of stacked modules with each module comprising an internal core and an external housing. Each core includes one integral fluid conduit which extends from the bottom of the core and opens through the side of the core into an annular chamber formed between the core and the housing. The housing then contains means for conducting the fluid out of the annular chamber. Additional features of the present invention include fluid sealing means in each module between the core and the housing above and below the annular chamber as well as fluid seals at the interfaces of the internal fluid conduits in adjacent cores.

DESCRIPTION OF THE PREFERRED EMBODIMENT

Figure 1:
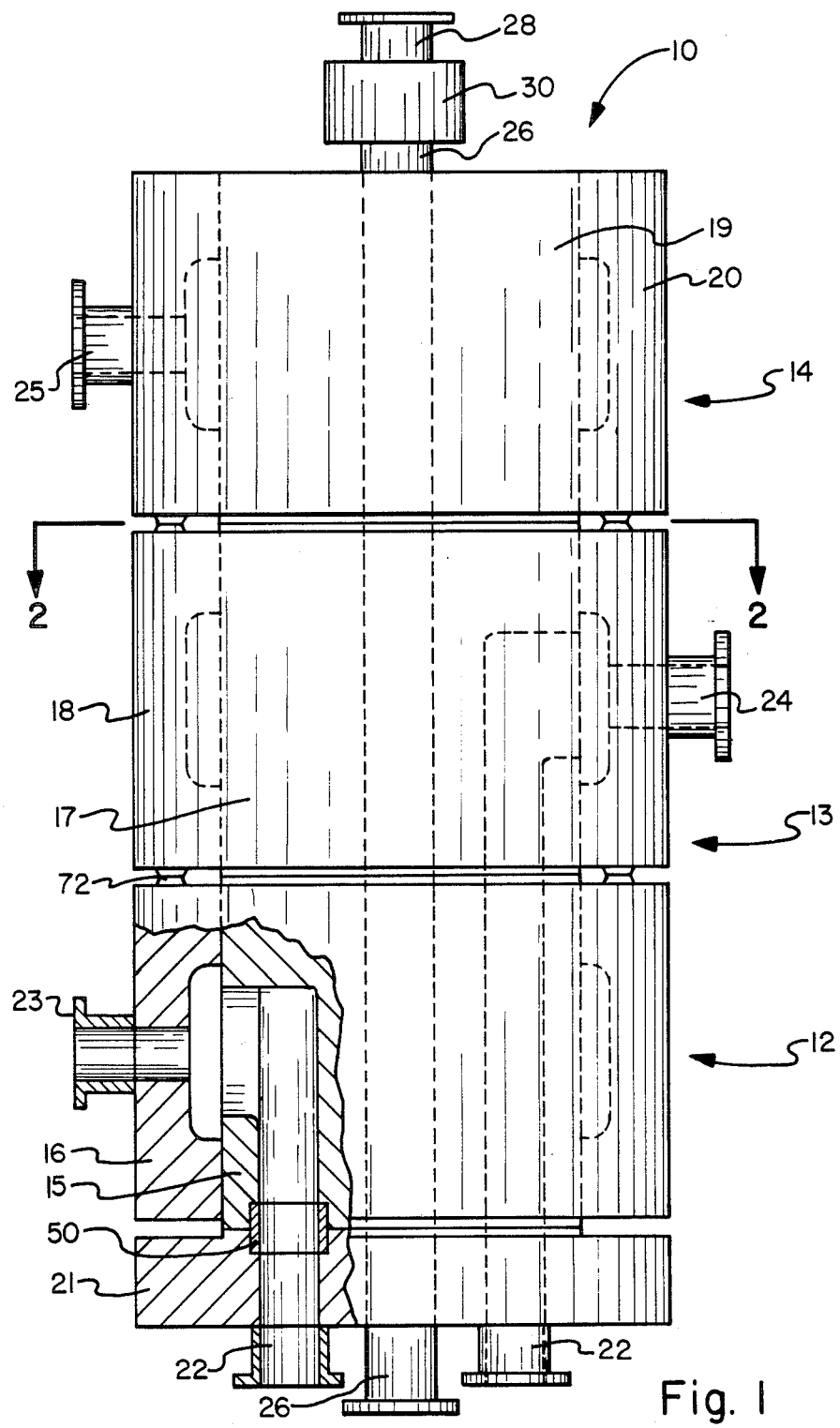
FIG. 1 is a general view of the swivel of the present invention partially in cross-section.

The swivel 10 of the present invention is generally shown in FIG. 1 and comprises the modules 12, 13 and 14 each of which has a core and a housing. Module 12 comprises the core 15 and housing 16, module 13 comprises the core 17 and housing 18 and module 14 comprises the core 19 and housing 20. Although the swivel has been illustrated as containing three modules, the swivel may contain any desired number of modules. The lower one of the cores 15 is mounted on a base unit 21. Attached to the bottom of the base unit 21 are a plurality of nozzles 22 for the introduction of fluids into the swivel. Each module then has its own nozzle 23, 24 and 25 for withdrawing the fluids from the swivel. For ease of description, the nozzles 22 will be described for the purpose of introducing fluids into the swivel and nozzles 23, 24 and 25 will be described for the purpose of withdrawing fluids from the swivel but it should be recognized that the fluid flow can be in either direction as desired. Also entering the base unit 21 is a pipe 26 which does not form a part of the actual swivel but merely extends all the way up through the central axis of the swivel and exits at the top. This pipe 26 then is connected to pipe 28 by means of an independent single line swivel 30.

Figure 2:
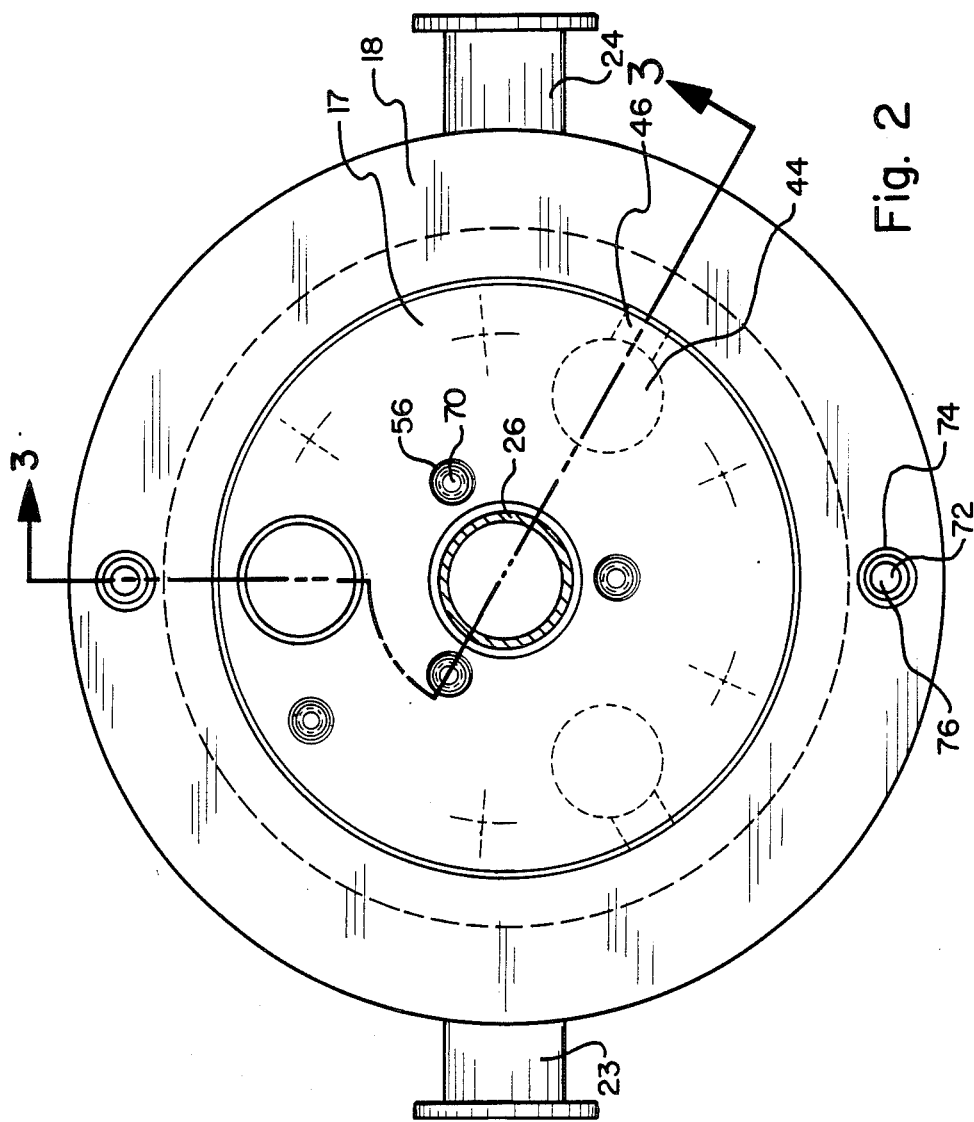
FIG. 2 is a cross-sectional view taken along plane 2—2 of FIG. 1.
Figure 3:
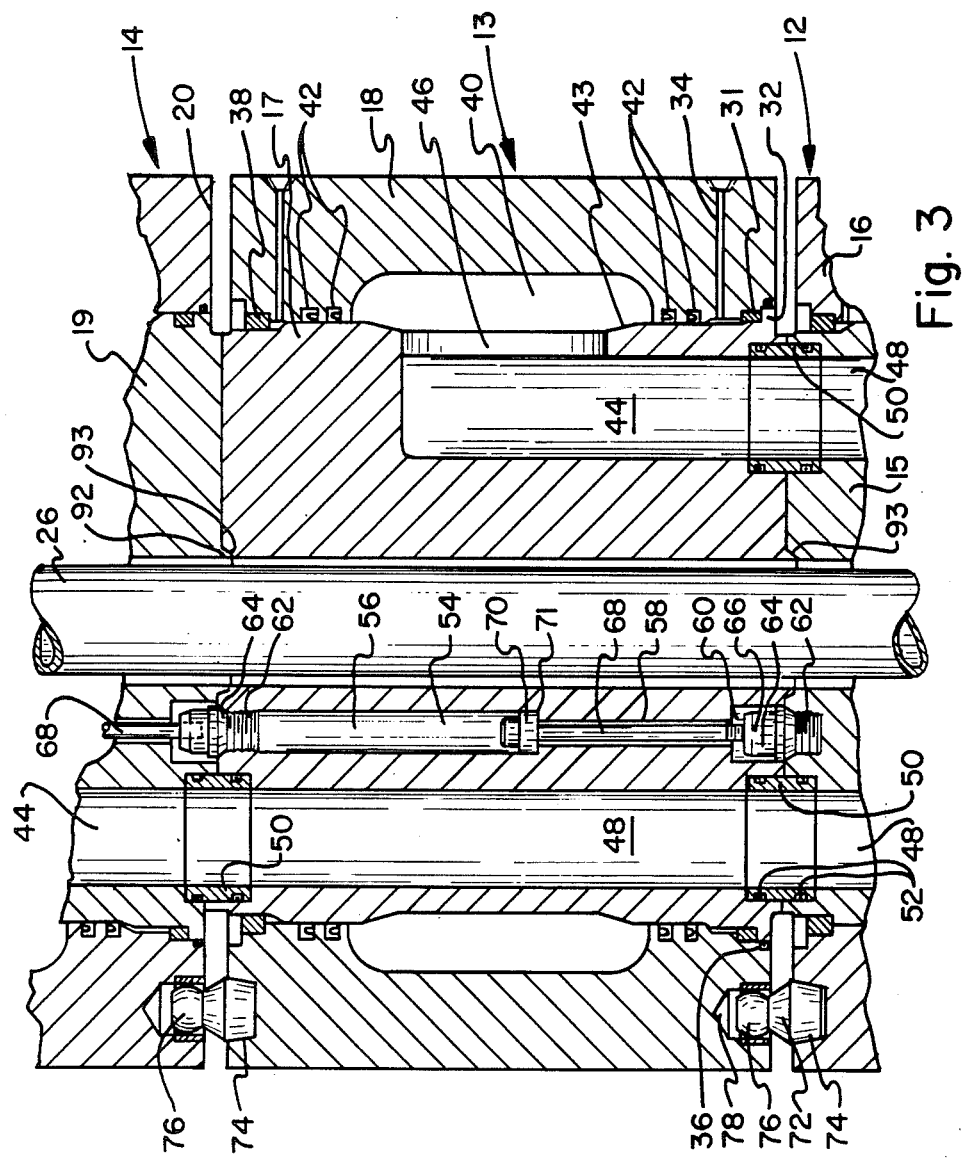
FIG. 3 is a detail view in vertical cross-section of a portion of the swivel taken along plane 3—3 of FIG. 2.

Referring now to FIGS. 2 and 3 for more details of the present invention, FIG. 3 shows the housing 18 and the core 17 in vertical cross-section as well as portions of the adjacent cores 15 and 19 and housings 16 and 20. Referring to core 17 as being typical, the core consists of a generally cylindrical piece having an external surface which is quite accurately machined within very close tolerances. The core 17 therefore fits within the housing 18 such that there is a very accurately controlled gap between the core 17 and the housing 18. As can be seen in FIG. 3 and as more clearly shown in FIG. 4, the housing 18 includes an annular bearing 31 which rests on the annular lip 32 of the core 17. This bearing 31 serves to support the housing 18 on the core 17, maintain the core 17 centered within the housing 18 and serve as the bearing permitting rotation of the housing 18 around the core 17. In order to lubricate this bearing 31, a lubrication port 34 is provided for the injection of a lubricant into the space between the housing 18 and the core 17 adjacent the bearing 31. An annular seal 36 is located below the bearing 31 and between the lip 32 and the housing 18 to prevent leakage of the lubricant. An annular bearing 38 is located at the top of the module between the housing 18 and the core 17 which again maintains the core 17 centered within the housing 18.

Figure 4:
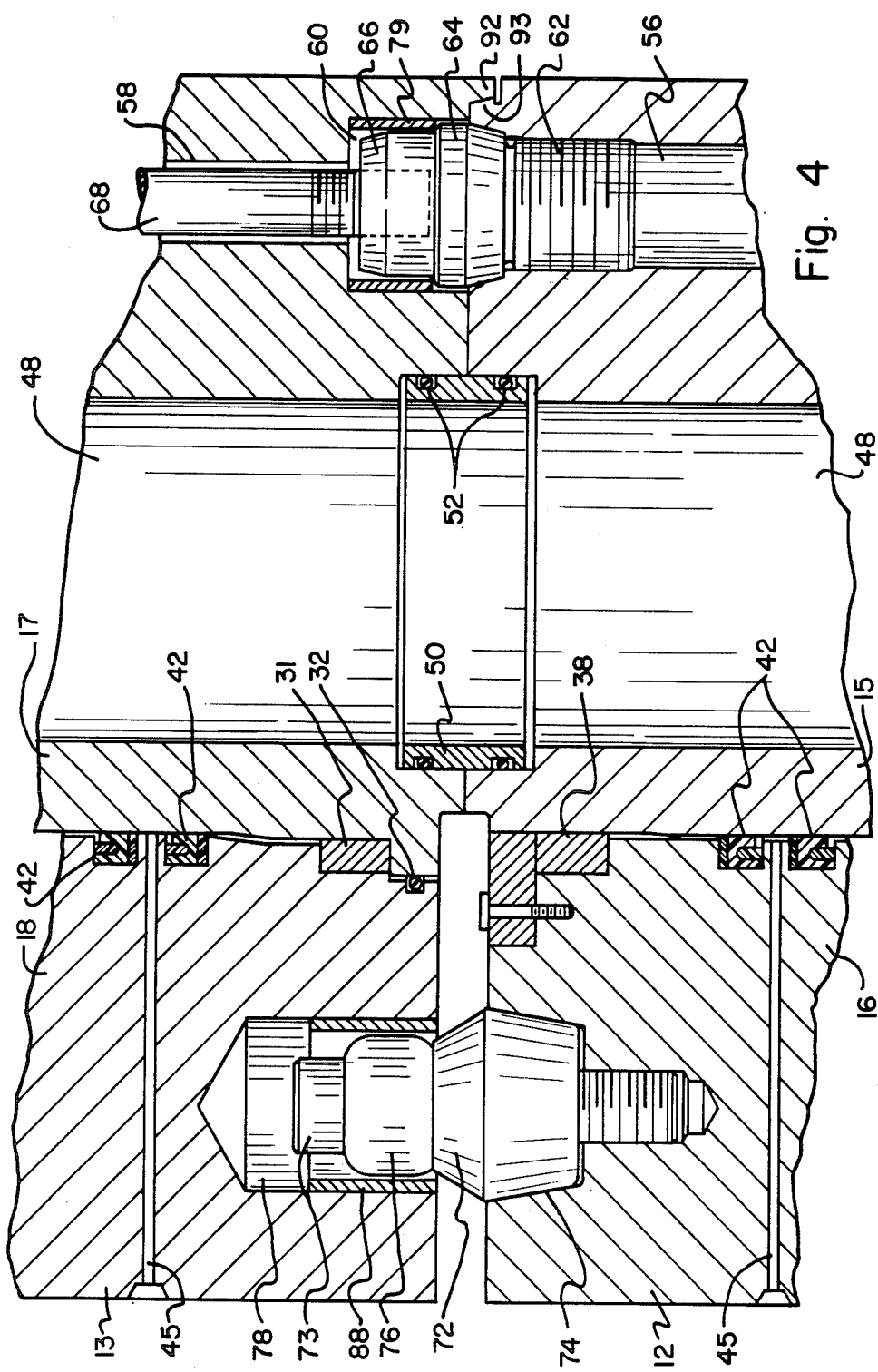
FIG. 4 is an expanded view of a portion of FIG. 3 showing further details of the junction between two modules.

The housing 18 has a cutout portion on its internal surface which forms the annular flow chamber 40. In order to prevent the fluid from leaking out of the annular flow chamber between the housing 18 and the core 17, sealing means 42 are provided. A preferred sealing means 42 will be more fully described hereinafter. A multiplicity of seals 42 can be provided as shown for redundancy, or for having a differential pressure between two seals to attain a greater pressure capacity for the module. The housing is provided with a passage 45 as shown in FIG. 4 between the seals 42, to permit venting or collection of inner seal leakage, or be used to flush undesired materials from the seal, or to add lubricant to increase the life of the seal. This port also can be used for injection of a sealant for an interim period while awaiting replacement of the seal.

The housing 18 is assembled onto the core 17 from the top and lowered down around the core 17. The external surface of the core is configured such that this assembly will be facilitated and such that there will be a minimum amount of accurate machining required of the external surface of the core. In this respect, it can be seen that the inside diameter of the bearing 31 and the external diameter of the core 17 adjacent the bearing 31 are larger than the various diameters of the core above this point such that the bearing 31 will not interfere with assembly. Also, the central part of the core is recessed at 43 since it need not be machined as accurately as the bearing and sealing surfaces. Since it is recessed, the tolerances can be greater without causing interference in the assembly process.

Referring now again to FIGS. 2, 3, and 4, the core 17 will be more fully described. Each core contains an integral flow channel 44 which would normally be drilled or otherwise machined or formed in the core 17. This flow channel 44 is open to the bottom of the core 17 and extends upwardly somewhat past the midline of the core. An essentially rectangular outlet slot 46 extends from the flow channel 44 to the exterior side surface of the core 17 and thus connects the flow channel 44 with the annular flow channel 40. Therefore, fluids which are flowing up from the ocean floor into the flow channel 44 will flow out through the slot 46 into the annular chamber 40 and then out through the nozzle 24 shown in FIG. 1.

Each of the cores except the top core in a stack will also contain at least one additional integral flow channel 48 which is also open to the bottom of the core and extends all the way up through the core and is open to the top of the core. As can be seen in FIG. 3, the one flow passage 48 which is illustrated is aligned with the flow passage 44 in the core 19 situated immediately above such that the fluid will flow up through the flow passage 48 in cores 15 and 17 and then into the flow passage 44 in core 19 after which it will exit in a similar manner out through the slot 46 in core 19 and the annular chamber 40 and the nozzle 25 in module 14. In order to prevent leakage at the interface between the flow passage 48 in one core and the flow passage 44 or 48 in the next core, sealing means are provided. The preferred sealing means may be referred to as a stab seal or flow sleeve which is shown in FIGS. 1, 3 and 4 and which is an annular ring 50 extending between and recessed into the two adjacent cores. Sealing means such as O-rings 52 are then provided between the stab seal and the cores to provide the actual seal. These seals will allow slight movements due to thermal or pressure induced deflections without loss of seal.

FIG. 3 illustrates the arrangement for fastening adjacent cores together by means of a dowel and bolt arrangement. Extending through the core 17 from top to bottom is a passageway 54 which comprises a large bore portion 56, a smaller bore portion 58 and another large bore recess portion 60. The upper portion of the large bore portion 56 is threaded at 62. Threaded into this portion 62 is the retaining member 64. This retaining member 64, as well as being threaded into the threaded portion 62, extends up into the large bore recess 60 of the core located above. This retaining member 64 thus acts as a dowel for the rough alignment of the two cores and provides torque carrying capacity to prevent rotation of one core with respect to the other. A pliable sleeve 79 surrounds member 64 allowing for slight misalignment while providing a torque carrying capacity. The retaining member 64 also includes an internal threaded portion 66 which is employed to bolt the two core sections together. After the retaining member 64 is placed into one core section, the core section above would be put in place such that the extending portion of the fastening member 64 extends up into the recess 60. The retaining bolt 68 would then be inserted down through the large bore portion 56 of the upper core section and screwed into place into the retaining member 64 with the head 70 of the retaining bolt bearing on the ledge 71 between the large bore portion 56 and the smaller bore portion 58. Therefore, the retaining or fastening arrangement combines the alignment and torque carrying capacity of dowels along with the axial load carrying capacity of a bolt, all within a minimum amount of space. As is clear from FIG. 2, as many fastening arrangements may be employed to fasten two core sections together as may be required. The modules are precisely centered by a conical stabbing point 92 which fits into a matching conical opening 93 in the next lower module or base plate 21.

The housings are shorter in height than the cores such that there will be a space between successive housings as shown in FIG. 1 and 3. The housings are not rigidly fastened in place but merely rest on the annular rings 32 as previously described and are maintained in place merely by gravity. However, adjacent housings are linked to each other by the aligning device 72 shown in FIGS. 1, 2, 3 and 4. This aligning device 72 fits into the recesses 74 in the upper portion of each housing and is bolted in the recess 74 by a bolt 73 extending down through the center of the aligning device 72. The upper portion of the aligning device 72 is a generally spherical portion 76 which would be similar to a trailer hitch with this spherical portion 76 extending up into the recess 78 in the bottom of the housing which is located above. This spherical portion 76 in the recess 78 permits motion between the two housings and yet provides alignment and torque carrying capacity. The recess 78 may be lined with a sleeve 88 such as polytetrafluoroethylene or polyurethane as shown in FIG. 4 to facilitate the relative motion between the housings.

Figure 5:
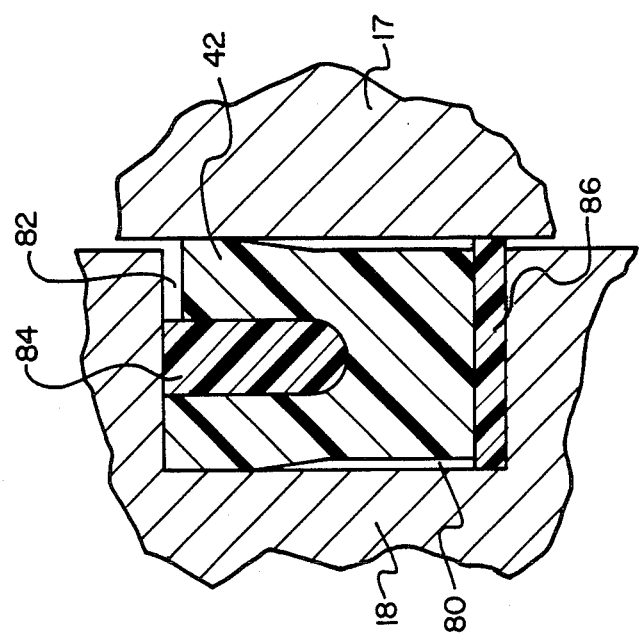
FIG. 5 is a detail view in cross-section of the sealing means.

The preferred sealing means 42 is shown in FIG. 5. The sealing means 42 is an annular ring which has a cross section of a generally U-shape as shown in this FIG. 5. The preferred material for the seal 42 is an elastomeric material such as a filled fluorocarbon polymer (polytetrafluoroethylene) or a polyphenylene sulfide plastic. The particular configuration and the sizing of the seal are such that the distance between the outer tips of the U-shape are greater than the distance between the surface of the housing 17 and the inner surface 80 of the seal groove 82 in the housing 18. Located in the internal portion of the U-shaped seal 42 is soft elastomeric, a resilient insert 84 which may be formed of rubber or a rubber-like material which provides resilience that assists in forcing the seal 42 against the sealing surfaces. This particular seal arrangement is very effective in sealing against high pressures such as 5,000 psi and yet permitting rotation of the housing with respect to the core. Also, the pressure on this seal is on the open end of the U-shape which therefore tends to compress the insert 84 which provides additional force to spread the seal 42 into the sealing contact. Located below the seal 42 is a hard retainer 86 formed for example from polyetheretherketone or other suitable material which prevents the seal 42 from being extruded into the gap between the housing and the core. This sealing means 42 is particularly beneficial in providing fluid seal under high pressures when there is slow oscillatory motion.

One of the advantages of the present invention is that the flow channels in the cores are integral flow channels. By the term "integral flow channels" it is meant that these channels serve as the actual flow passages rather than mere openings through which pipes extend as found in the prior art. This means that the size of the machined openings can be considerably smaller than if the openings had to be large enough to accommodate a pipe which itself was large enough to contain the large pressures. In view of this, the entire core may be made smaller in diameter to accommodate the same number and size of lines or, in the alternative, a core of the same size as in the prior art would accommodate considerably more lines.

As can be seen in FIGS. 1, 3 and 4, there are spaces between adjacent housings 16 and 18 for example. Because of these spacings, the housings will not interfere with each other in the event that there is a bending or warping of the cores. Although any bending or warping may be slight, it can occur for example when there are temperature and/or pressure differences between the various flow channels in the core. Since the housings are spaced and do not interfere with each other, a housing will follow any bending or warping or other displacement of its corresponding core and there will be little or no affect on the seal between the housing and the core.

In this description, the cores have been described as being stationary with the housings rotating around the cores. The term "stationary" as applied to the cores is a relative term meaning that the cores are relatively stationary with respect to the ocean floor as compared to the housings which rotate with respect to the cores and therefore with respect to the ocean floor. The term stationary is not intended to mean that the cores are absolutely stationary. This multi-path fluid swivel is intended for primary use with lines ranging from 2 inch to 16 inch nominal diameters, but is not limited to those sizes. The present invention is significantly different in design than existing hydraulic control swivels which normally have multiple lines of smaller than one inch diameters.

One of the significant advantages of the present invention is that the cores are adapted to accommodate many different flow arrangements such as the number and size of flow passages without changing the diameter of the core which allows for standardization of parts such as seals. Spare cores and housings can be stocked as blank parts ready for final machining of the proper size conduits for a particular module being replaced. Another advantage of the present invention is that individual modules can be removed for service or replacement at the operating site.

We claim:

1. A multiple line fluid swivel for conducting fluids to and from a multiplicity of stationary lines and a multiplicity of corresponding rotating lines, at least some of which lines are adapted to conduct fluids at a pressure in excess of 1000 psi comprising:
   a. a first lower core having a first integral fluid conduit formed therein open to the bottom of said first core and extending from said bottom and opening through the side of said first core and a second integral fluid conduit extending axially through said core,
   b. a second upper core having an integral fluid conduit formed therein open to the bottom of said second core and extending from said bottom and opening through the side of said second core,
   c. means securing said upper core to said first lower core including means to prevent rotation of said cores with respect to each other whereby said integral fluid conduit in said second core interfaces and is aligned with the second integral fluid conduit of said first core,
   d. means forming a high pressure fluid seal to prevent leakage at said interface of fluid flowing from said second integral fluid conduit of said first core into said integral fluid conduit of said second core,
   e. a housing closely surrounding each core, each housing independently rotatably supported on said corresponding core, said housings each cooperating with the corresponding core to form an annular chamber between said housing and core in alignment with the side opening of the core, and a side opening from said annular chamber to the exterior of said housing whereby fluid may flow from said side opening in said core into said annular chamber and out through said side opening, each housing being spaced from the adjacent housing to thereby permit relative motion of one housing with respect to the adjacent housing in the axial direction,
   f. high pressure sealing means between each of said housings and its corresponding core located above and below said annular chamber to prevent leakage of fluid from said annular chamber said sealing means permitting rotation of said housings with respect to said cores, and
   g. means extending between adjacent housings to prevent relative rotation between the two housings while permitting axial movement of one housing with respect to the adjacent housing.

2. A multiple line fluid swivel as recited in claim 1 wherein said annular chamber comprises a recessed portion formed into the internal surface of said housing.

3. A multiple line fluid swivel as recited in claim 1 or 2 wherein each said housing is rotatably supported on said corresponding core by means of an annular lip extending outwardly from said core and a bearing mounted on said housing resting on said lip whereby said bearing rotates on said lip.

4. A multiple line fluid swivel as recited in claim 3 and further including means for lubricating said bearing.

5. A multiple line fluid swivel as recited in claim 1 wherein said means extending between adjacent housings comprises a generally ball shaped member affixed to one housing and extending into a socket on the adjacent housing such that said ball may rotate in said socket and transfer rotational forces from one housing to the adjacent housing.

6. A multiple line fluid swivel as recited in claim 5 and further including a pliable sleeve surrounding said ball in said socket to thereby accommodate misalignment.

7. A multiple line fluid swivel as recited in claim 1 or 2 wherein said fluid sealing means recited in claim 1 (f) comprises a generally U-shaped annular seal ring with one tip of the U adjacent said housing and the other tip of the U adjacent said core.

8. A multiple line fluid swivel as recited in claim 7 wherein the open end of the U faces towards said annular chamber.

9. A multiple line fluid swivel as recited in claim 8 wherein said generally U-shaped annular seal ring is formed of a relatively rigid polymeric or elastomeric material and further including a resilient insert in said U-shape adapted to exert pressure outwardly on said U-shape.

10. A multiple line fluid swivel as recited in claim 9 wherein said relatively rigid polymeric or elastomeric material is selected from the group consisting of filled polytetrafluoroethylenes and polyphenylene sulfides and said resilient insert is a rubber-like material.

11. A multiple line fluid swivel as recited in claim 9 and further including a support member supporting said U-shaped annular seal ring, said support member being formed of a material which is more rigid than said U-shaped annular seal ring and extending between said core and said housing and bridging any gap between said core and said housing so as to prevent said U-shaped annular seal ring from being extruded into any said gap between said core and said housing.

12. A multiple line fluid swivel as recited in claim 1 or 2 and further including means extending between adjacent cores to prevent relative rotation and vertical movement between two adjacent cores.

13. A multiple line fluid swivel a recited in claim 12 wherein said means extending between adjacent cores comprises a combination dowel and bolt arrangement which rigidly connects two adjacent cores.

14. A multiple line fluid swivel as recited in claim 1 or 2 in which adjacent cores are centered with respect to each other by means of a conical projection on one core which extends into a matching conical opening in the adjacent core.

15. A multiple line fluid swivel as recited in claim 1 or claim 2 wherein each stationary core and its corresponding housing forms a swivel module thereby forming a stack of swivel modules and wherein each swivel module is individually removable from said stack of swivel modules.

16. Sealing means for sealing between a surface of an inner cylindrical member and a surface of an outer member surrounding said inner cylindrical member wherein said inner cylindrical member and said outer member rotate with respect to each other and wherein a gap may exist between said inner cylindrical member and said outer member and wherein said seal is subjected to a fluid pressure from one side thereof comprising:
an annular fluid seal having a generally U-shaped cross section formed by projecting members defining a groove therebetween said seal formed of a relatively rigid polymeric material which has a low coefficient of friction and is of such rigidity and strength to essentially maintain its basic shape and yet conform to the surfaces being sealed;
an annular insert within said groove, said insert formed of a resilient rubber or rubber-like material adapted to exert uniform pressure outwardly within said groove to force the projecting members of said seal outwardly into contact with the surfaces to be sealed;
said annular insert wholly filling said groove in the presence or absence of fluid pressure, said annular insert in compression as a result of contact over substantially all of its periphery within said groove and with said outer member;
wherein the open end of said u-shape is not the side subjected to the fluid pressure; and
further including a support member supporting said U-shaped annular fluid seal on the side thereof opposite from said fluid pressure with said support member being formed of a material which is more rigid than said U-shaped annular fluid seal which extends between said inner cylindrical member and said outer member bridging any gap between said inner cylindrical member and said outer member so as to prevent said U-shaped annular fluid seal from being extruded into said gap.

* * * * *